(12) United States Patent
Waegerle

(10) Patent No.: US 6,430,924 B1
(45) Date of Patent: Aug. 13, 2002

(54) HEAVY-DUTY TRANSPORTING SYSTEM, AS WELL AS DRIVE MODULE AND HYDRAULIC UNIT FOR IT

(76) Inventor: Wolfgang Waegerle, Boehringer Strasse 12, D-74357 Boennigheim (DE)

( * ) Notice: Subject to any disclaimer, the term of this patent is extended or adjusted under 35 U.S.C. 154(b) by 0 days.

(21) Appl. No.: 09/667,266

(22) Filed: Sep. 22, 2000

(30) Foreign Application Priority Data

Sep. 24, 1999 (DE) .......................... 199 45 750

(51) Int. Cl.⁷ .............................. F16D 31/02
(52) U.S. Cl. .......................... 60/483; 60/484
(58) Field of Search .......... 60/420, 483, 484; 91/508

(56) References Cited

U.S. PATENT DOCUMENTS

| | | | |
|---|---|---|---|
| 3,163,008 A | * 12/1964 | Hansen | 60/483 |
| 3,612,312 A | 10/1971 | Behrmann | |
| 3,702,642 A | * 11/1972 | Greene | 60/483 X |
| 4,098,083 A | * 7/1978 | Carman | 60/483 X |
| 4,244,184 A | * 1/1981 | Baldauf et al. | 60/483 X |
| 4,492,148 A | * 1/1985 | Kuromoto | 91/527 X |
| 5,014,596 A | * 5/1991 | Martin | 91/527 X |
| 5,207,060 A | * 5/1993 | Sheets | 60/483 |
| 5,810,046 A | * 9/1998 | Lee | 91/527 X |

* cited by examiner

Primary Examiner—Hoang Nguyen
(74) Attorney, Agent, or Firm—Michael J. Striker

(57) ABSTRACT

A heavy-duty transporting system has motor-driven drive modules each having a motor and at least one drive roller connected therewith, the motors being formed as hydraulic motors, a central hydraulic unit connected with the hydraulic motors through hydraulic hoses, two hydraulic circuits which are supplied by the central hydraulic unit, the central hydraulic unit controlling a throughflow for each of the hydraulic circuits, each of the hydraulic motors being connected with one of the hydraulic circuits by a hydraulic hose.

12 Claims, 5 Drawing Sheets

HEAVY-DUTY TRANSPORTING SYSTEM, AS WELL AS DRIVE MODULE AND HYDRAULIC UNIT FOR IT

BACKGROUND OF THE INVENTION

The present invention relates to a heavy-duty transporting system. It also relates to a drive module for the transporting system as well as to a hydraulic unit for the system.

Heavy-duty transporting systems and devices of different types are known. They include simple but driveless transporting devices, such as sack barrows or lifting trucks, with which transporting pallets are moved with heavy objects or materials supported on them. Since exclusively muscle force is utilized, the loads must not be too heavy. The transporting systems and devices which are used for heavier loads and driven by motors, such as forklifts or motor trucks are expensive. They are driven by electric motors or internal combustion engines and in many cases are big, not seldom so big as the object to be transported. From this special machinery, big heavy-duty transporters are known which can transport especially heavy loads.

U.S. Pat. No. 3,612,312 discloses a heavy-duty transporter for transporting of ship parts or other very heavy objects. The heavy-duty transporter is a vehicle with multiple-wheel drive modules ("multi wheeled vehicles"), each driven by an electric motor. The load to be transported is carried by the drive modules, which are controlled moreover from a central drivable unit ("command vehicle"). This known system is very expensive, it has the dimensions of big motor trucks and can be used only to a limited extent in the interior of structures.

Therefore, there are either only expensive motor-driven transporting system which are very big and can be used to a limited extent in the interior of structures, or very small driveless transporting devices, such as sack barrows or lifting trucks.

SUMMARY OF THE INVENTION

Accordingly, it is an object of present invention to provide a heavy-duty transporting system with motor-driven drive modules which are smaller and less expensive than the existing systems and is especially suitable to transport heavy objects in the interior of structures in a simple and reliable manner.

In keeping with these objects and with others which will become apparent hereinafter, one feature of present invention resides, briefly stated, in a heavy-duty transporting system with motor-driven drive modules each having a motor and at least one drive roller, wherein the motors are formed as hydraulic motors which are connected through hydraulic hoses with a central hydraulic unit, the hydraulic unit supplies at least two hydraulic circuits, the hydraulic unit for each hydraulic circuit controls the throughflow, and each hydraulic motor is connected by the hydraulic hose with one of the hydraulic circuits.

In accordance with the present invention also a drive module for a heavy-duty transporting system is proposed with a motor and at least one connected drive unit, wherein the motor is a hydraulic motor and it is connected through hydraulic hoses with a central hydraulic unit.

In accordance with another feature of present invention, the hydraulic unit for a heavy-duty transporting system with motor driven drive modules each having a motor with at least one drive motor is proposed, wherein the motors are hydraulic motors, the hydraulic unit is connected through hydraulic hoses with the hydraulic motors and it is centrally supplied through at least one hydraulic circuit, each hydraulic motor is connected to the hydraulic circuit, and the hydraulic unit for each hydraulic circuit controls the throughflow.

In the present invention, the drive modules are provided with hydraulic motors which are connected through hydraulic hoses with a central hydraulic unit, which supplies at least two hydraulic circuits, and for each hydraulic circuit it controls the throughflow, and each hydraulic motor is connected by the hydraulic hose with one of the hydraulic circuits. Because of the hydraulic motors, the drive modules can be very compact and at the same time produce a great drive force. The control of the flow can be performed with a so-called 0/1 control, with which the hydraulic valves close the circuit for the hydraulic medium or open the same. Instead of this "hard" control, also a so-called proportional control is possible, in which a proportional valve limits the throughflow from 0 to 100%. By this "soft" control, the rotary speed of the drive force of the hydraulic motor is controllable very accurately, so that each drive module can be moved very precisely, and preferably very heavy loads (100 tons and more) can be transported. Moreover, due to the central hydraulic unit, the different circuits can be supplied and several drive modules can be controlled separately from one another, so that the whole heavy-duty transporting system is very simple and precise for maneuvering.

The system can run not only forwardly and rearwardly as well as one narrow curves, but can be also turned at the same spot. It is especially advantageous when the central hydraulic unit has at least one hydraulic pump which compresses a hydraulic medium for throughflow through the hydraulic circuit and a valve arrangement connected to it for control, which controls the throughflow of the hydraulic medium for each hydraulic circuit in correspondence with the control signals, which are sent by a remote control element connected with the control. With this special feature, a reliable central control for the different circuits is provided, which can be remotely operated from outside. The movement of the drive module can be controlled from the spot on which the object to be transported is located and in full extent.

In connection with this, it is especially advantageous when the control is connected with a wire-connected remote control element and/or with a wireless remote control element, and when the control ignores the controlling signals coming from the wireless remote control element, the wire-connected remote control element is connected. The wireless remote control element in this case is deactivated. As a wireless remote control element a radio or infrared transducer can be used and it is guaranteed that in the case of interferences of this wireless remote control element, such as by radio interference, the system nevertheless remains remotely controllable by operating through a disturbance-free wire connection. Moreover, the preference of the wire-connected remote control element makes possible a reliable practical control element of the system, in which an uneducated person uses the radio remote operation of the system, while an educated person monitors it and in some cases can help each time with the wire-connected remote control element.

A further advantage is when the valve arrangement provided for the control changes the flow direction inside each hydraulic circuit based on the corresponding control signals. When the flow directions in two drive modules can be used differently, it is achieved that the whole system rotates on the same spot. Thereby the object to be transported can be turned from 0° to 360°. An accurate maneuvering at the narrow locations and in corners is therefore possible.

Furthermore, it is especially advantageous when additionally to the drive modules driven by the hydraulic modules, also driveless drive modules are provided, and when at least the driving modules are assembled by at least one rod-like connection with one another to form a drive frame. The drive frame is a very expensive drive set, which by expansion any number of driveless drive modules can be assembled in a cost favorable manner to form a modular transporting system. The transporting system can be adapted in an optimal manner to the requirements determined by the weight and dimensions of the transporting objects.

Moreover, it is advantageous when the drive frame has a rotary plate, on which the object to be transported is supported, so that the drive frame can freely rotatively move around the vertical axis. Thereby the transporting object located on the rotary plates can be turned in all directions in immovable position of the transporting system. Moreover, the drive frame can be rotated in any direction when the transporting system does not move forwardly. Thereby an unlimited maneuvering on the location can be provided.

The inventive drive module can be designed in an especially advantageous manner when at least one drive roller is a roller-shaped roller and composed of duroplastic synthetic resin. Thereby a very stable and supporting drive module is provided, which can support loads of several tons and move them forward.

In connection with this, it is especially advantageous when for mounting of the object to be transported, the upper side of the drive module has a metal plate with a predetermined bores pattern. With these features a variable and very stable mounting possibility is provided.

The novel features which are considered as characteristic for the present invention are set forth in particular in the appended claims. The invention itself, however, both as to its construction and its method of control element, together with additional objects and advantages thereof, will be best understood from the following description of specific embodiments when read in connection with the accompanying drawings.

DESCRIPTION OF PREFERRED EMBODIMENTS

Figure 1:
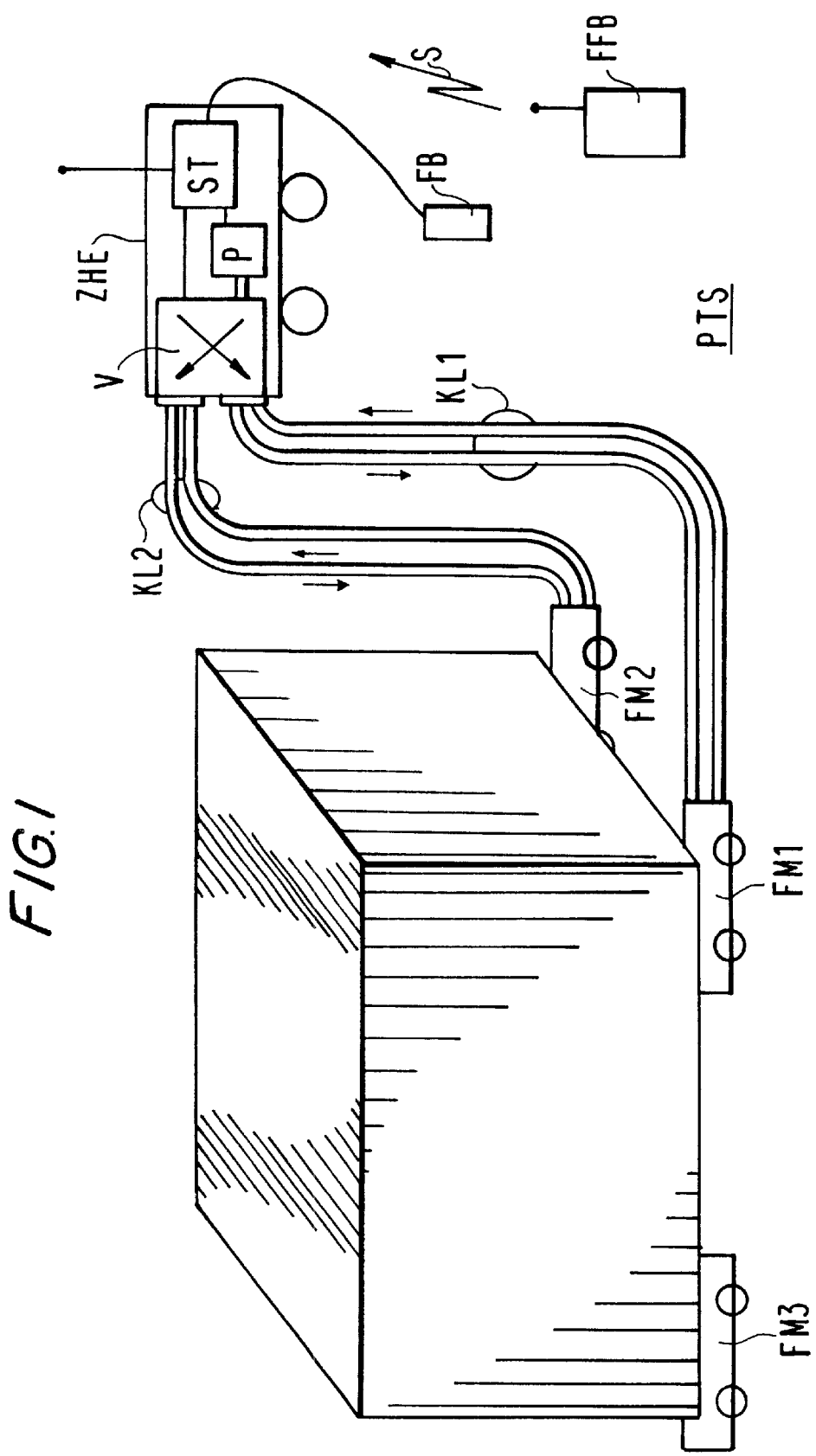
FIG. 1 is an overall view of a heavy-duty transporting system in accordance with the present invention.

FIG. 1 schematically shows the construction of the inventive heavy-duty transporting system PTC. In this example a system is described which has two motor-driven drive modules FMI and FM2 and two driveless drive modules, of which only one FM3 is shown. The system PTC contains moreover a central hydraulic unit ZHE which is connected through hydraulic hoses with the driven drive modules FM1 and FM2. The central unit ZHE supplies a first and a second hydraulic circuit KL1 and KL2, with which the first drive module FM1 and the second drive module FM2 are connected. The drive modules FM1 and FM2 contain not shown hydraulic motors which drive the corresponding two connected drive rollers.

The central hydraulic unit ZHE can control the throughflow of the hydraulic medium in the both hydraulic circuits KL1 and KL2 separately from one another. Thereby the drive modules FM1 and FM2 can move in the same directions or in directions which are different from one another. Correspondingly, the object to be moved can turn in one direction or on the same spot. The drive modules are formed very stable. The drive rollers are composed of duroplastic material and are exceptionally pressure-resistant. A single drive module can carry a load of approximately 18 ton. The system shown in FIG. 1 with four drive modules can correspondingly carry 60 ton of load. The drive modules are formed very compact and have a dimension of 40 cm length, 30 cm width, and 15 cm height. It is possible to expand the above described construction and increase the number of the drive modules, to form a very stable transporting system for a load of more than 200 tons.

The drive modules can be arranged in a very simple manner under the object to be transported, such as for example large machines, in particular lathes, drilling installations, printing machines, presses, milling machines, etc.

The central hydraulic unit ZHE produces with a hydraulic pump P a pressure of 180 bar. The compressed hydraulic medium is supplied through a valve arrangement in the circuits KL1 and KL2. The valve arrangement is controlled by an electronic control ST, and thereby the throughflow direction and the flow speed in the circuits can be changeably controlled. The electronic control contains a radio receiver which receives the control signals S from a wireless remote control element FFB. Moreover, the electronic control ST is connected with a wire-connected remote control element FB. The construction and the operation of the valve arrangement and the control ST connected with it will be described hereinbelow.

Figure 2:
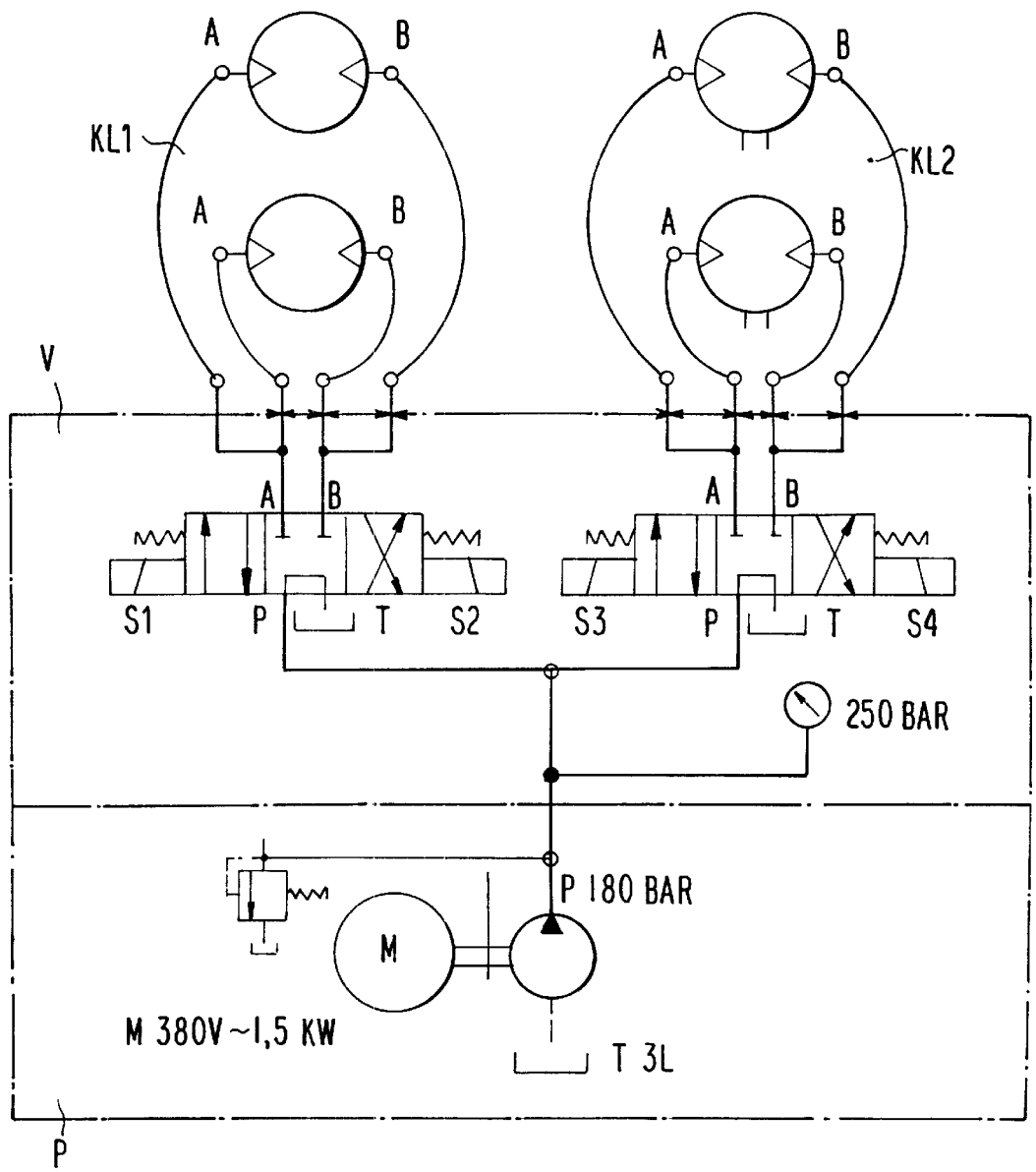
FIG. 2 is a view showing a hydraulic switching diagram for a central hydraulic unit in accordance with the present invention.

FIG. 2 shows the hydraulic switching diagram for the valve arrangement V as well as for the hydraulic pump P connected with it. The hydraulic pump contains an electric motor and produces by compression of the pressure medium (hydraulic medium) a pressure of 180 bar. Electric motor is supplied with alternating current with 360V and has a power of 1.5 kW. The compressed pressure medium is supplied into the valve arrangement. There the hydraulic medium is distributed into the first circuit KL1 and the second circuit KL2. The arrangement contains an electromagnet valve, which for each circuit controls the throughflow of the hydraulic medium.

When the valve is located in the position P, the hydraulic medium flows in a forward direction to the connections A, and then through the hydraulic motors and finally through the connections B back to the central hydraulic unit ZHE. When the valve is located in the position T, then the flow direction is reversed and the hydraulic motors operate this circuit in a rearward direction. For this purpose the electromagnetic 0/1 valve is switched by corresponding switching relays S1 to S4, and thereby they release or block the throughflow. The switching relays are connected through electronic control S3 shown in FIG. 1. Each circuit can be controlled separately. Instead of the 0/1 valve in the shown embodiment in a not shown embodiment a proportional valve can be utilized, with which both the throughflow direction and the flow speed can be controlled. Thereby a very power-intense transporting system is made, which can be moved very accurately.

The inventive system contains also a radio receiver for receiving the wireless transmitting signals S and a connection for a wire-connected remote control element FB. When the radio signal S is received in the receiver in a distorted state, or the radio transmitter FFB fails, the control signals coming from the wire-connected remote control element FFB are processed preferably. For simplification, the radio receiver is positively switched when the wire-connected remote control element FB is connected to the hydraulic unit. Thereby it is guaranteed that the central hydraulic unit ZHE is always reliably and without interference remotely controlled.

An emergency exit button is arranged on the central hydraulic unit, so that at anytime the hydraulic pump and thereby the forward movement of the drive module can be stopped. Also, the remote control elements can be provided with the emergency exit buttons.

As shown in FIGS. 1 and 2, at least one hydraulic motor is incorporated in each circuit. Each hydraulic motor has a power of 4 kW with a throughflow of approximately 25 liter per minute. A hydraulic motor operates through a pinion on the drive rollers provided with toothed wheels which preferably are composed of "DELRIN" (NYLON) and supported on the roller bearings or pressure ball bearings. With a lowering ratio of 24 pinion teeth to 60 toothed wheel teeth, the drive module moves with a maximum speed of approximately 30 m/min. This speed is sufficient to transport heavy machines, such as for example printing machines to a predetermined location. The speed of the drive module can be adjusted to the changeable throughflow of the hydraulic medium by the hydraulic motors, when proportional valves are utilized. The drive module can move exceptionally slow, whereby heavy loads of 200 tons can be moved in a very precise manner. At the same time it is avoided that the transporting object falls down or is damaged in any other way.

Figure 3A:
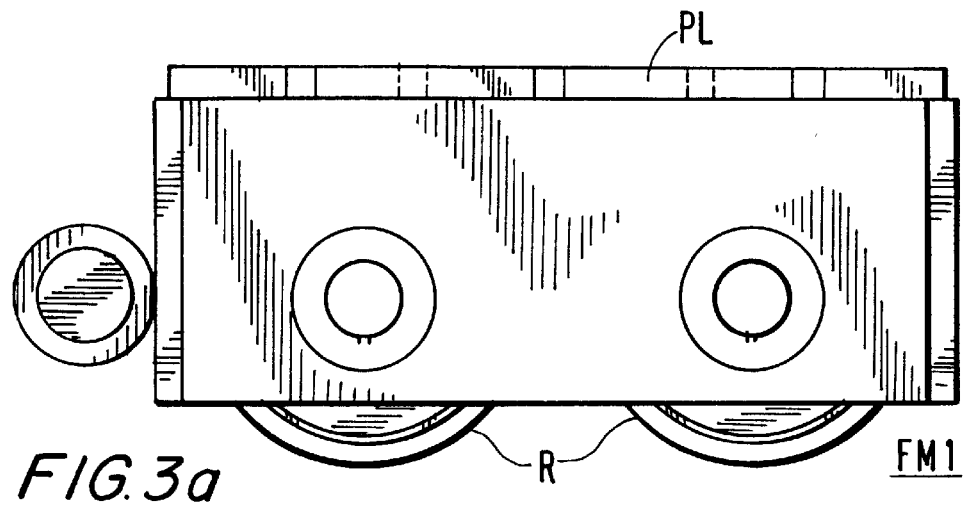
FIGS. 3a and 3b are views showing a motor-driven drive module in accordance with a first embodiment of present invention.
Figure 3B:
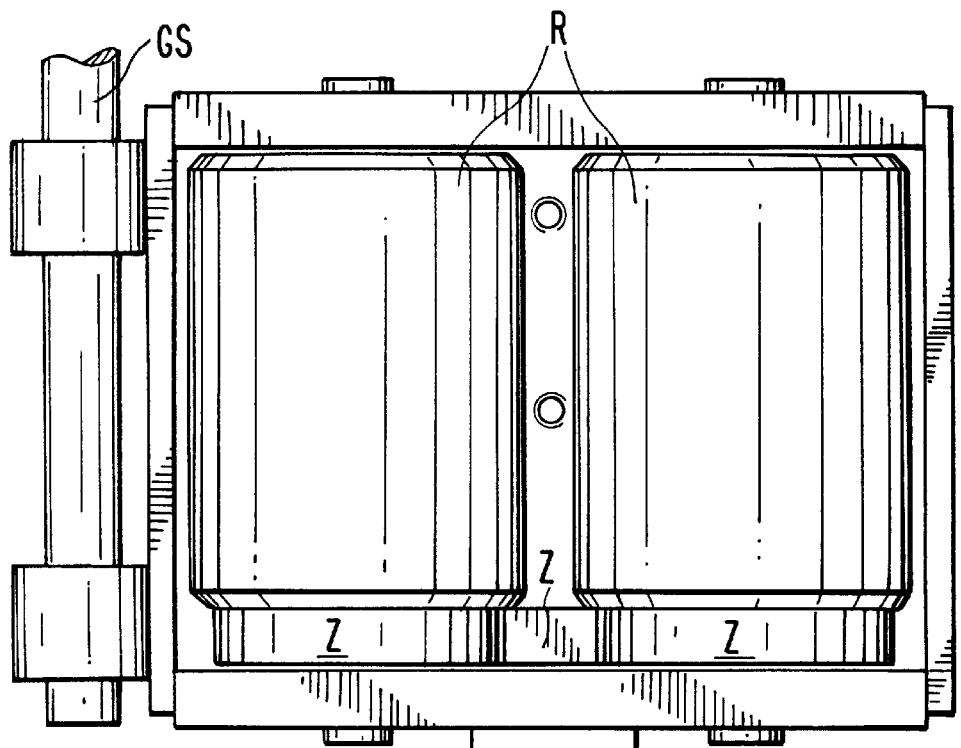

FIGS. 3a and 3b show the construction of a drive module FM1 on a side view (FIG. 3a) and on a plan view (FIG. 3b). The drive module has two roller-shaped rollers R which have a diameter of approximately 120 mm and the length of 160 mm. On the upper side of the drive module there is a metal plate PL with a bores pattern so that the drive module can be reliably screwed with the object to be transported. As shown in FIG. 3b, the rollers are driven through the toothed gears 3 from a hydraulic motor M1. The hydraulic motor is connected through the fast coupling SK to the hydraulic circuit, which is also connected to the central hydraulic unit. With the use of fast couplings SK, the whole system can be easily disassembled and assembled again. In order to connect one drive module to the other, at one end side of each drive module two ring-shaped receptacles for a connecting rod GS are arranged. Thereby two drive modules can be assembled very simple to one drive frame.

Figure 4A:
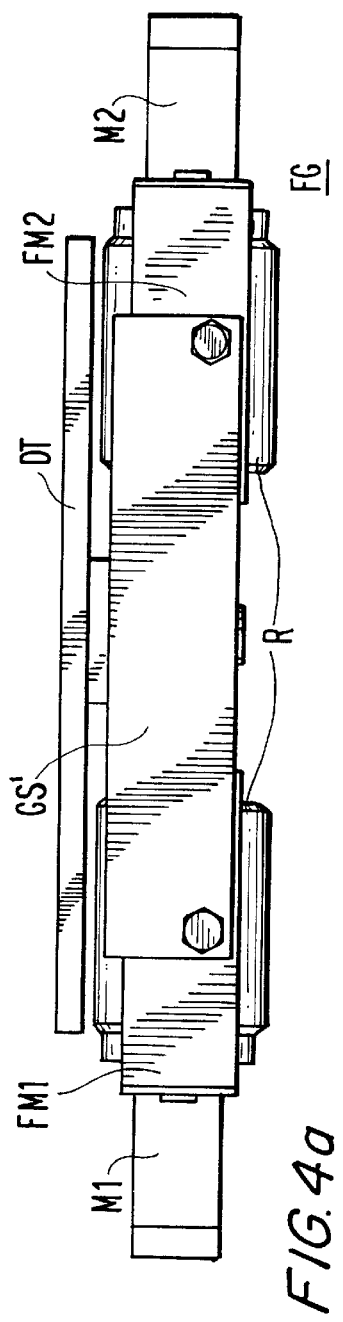
FIGS. 4a, 4b and 4c are views showing two motor-driven drive modules in accordance with a second embodiment of the present invention.
Figure 4B:
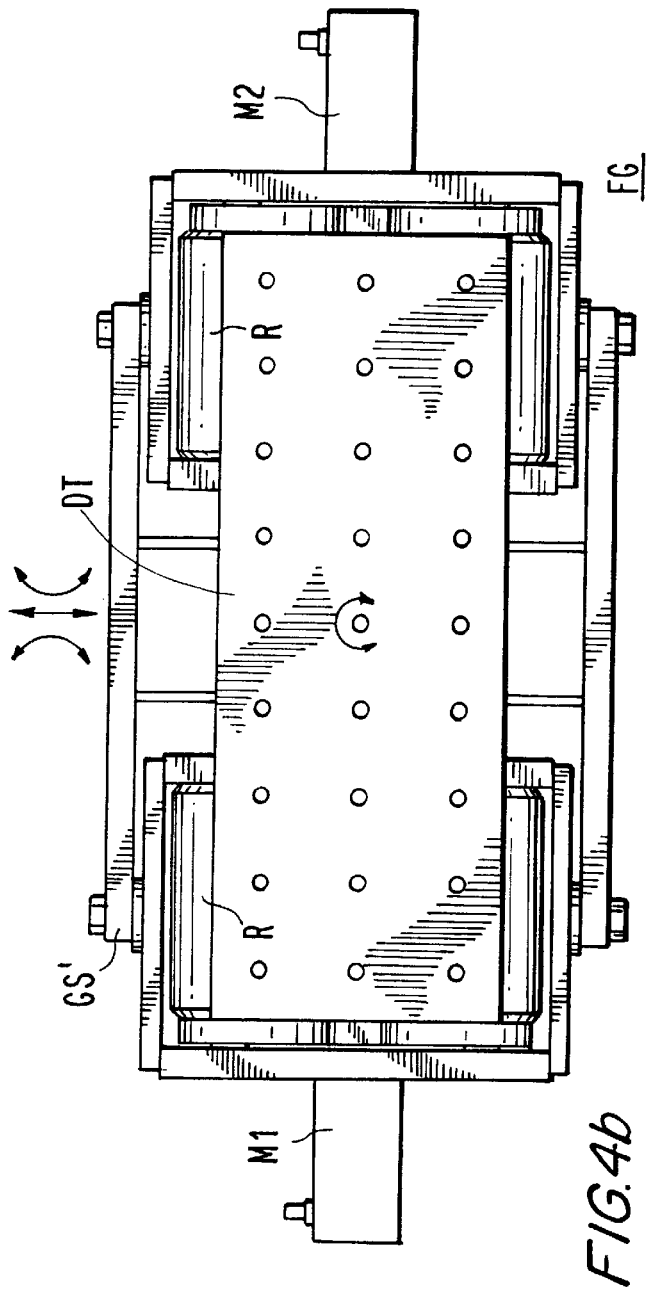
Figure 4C:
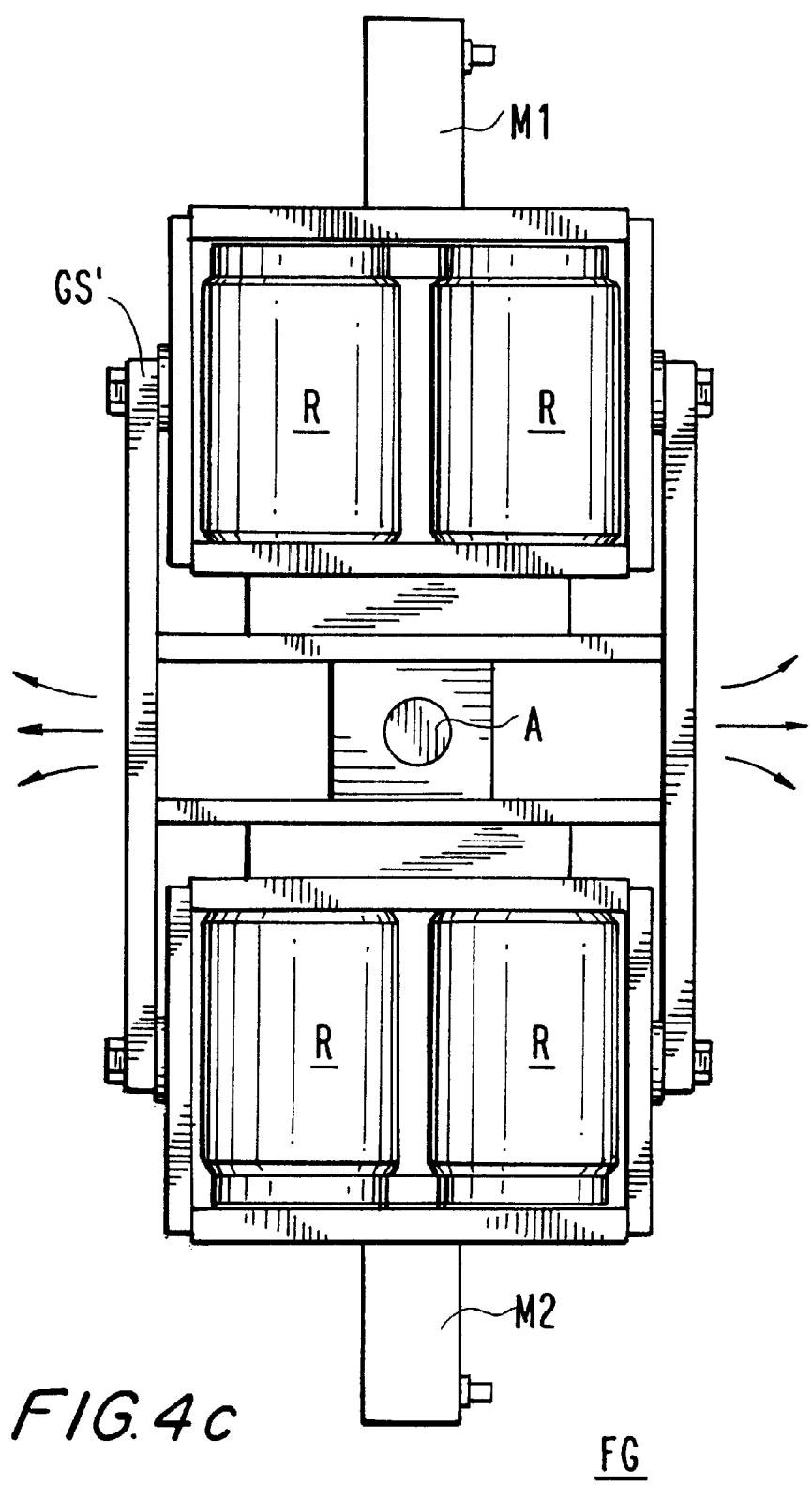

As shown in FIGS. 4a, 4b, 4c, two embodiments can be further provided for a drive frame FG, which has two drive modules FM1 and FM2 and a rotary plate GT. Each of the both drive modules FM1 and FM2 is formed substantially as shown in FIG. 3. In this example both drive modules are connected however not by a rod, but instead by two metal braces GS' rigidly with one another to form a drive frame FG. On the upper side of the drive frame, a rotary plate DT is arranged, and is supported rotatably in a receptacle A. A predetermined bores pattern (pattern of the drilled holes) is provided so that the drive frame FG can be reliably screwed with the transporting arrangement. The rotary plate DT is exchangeably placed in the receptacle A and can be replaced by a differently shaped rotary plate or by another receiving arrangement, such as for example a U-shaped fork in a very simple manner.

Due to the rotatable support, the transporting object can be turned also in the immovable position of the drive frame around a vertical axis. Moreover, it is possible to turn the drive frame on one spot. This is obtained by an opposite flow direction in the both hydraulic circuits. It is advantageous when such a drive frame is assembled together with two driveless drive modules to form a transporting system. The driveless drive modules are located at the rear end of the transporting object, and the drive frame is located at the front end in the center. The thusly formed rotary three-point support for heavy transporting objects has a design of a triple wheel. With throughflow of the circuits in the same direction, the total system can move forwardly or rearwardly. When the flow flows less through one circuit than through another, the drive frame performs a curve-shaped movement. When both circles are supplied with fluid in opposite directions, the drive frame rotates on the same spot, while the transporting object remains immovable. Thereby, all desirable drive movements in one plane can be performed fast and simple. The transporting system can be moved in arbitrary way, and all possible maneuvers can be performed in a very precise manner.

It will be understood that each of the elements described above, or two or more together, may also find a useful application in other types of constructions differing from the types described above.

While the invention has been illustrated and described as embodied in heavy-duty transporting system, as well as drive module and hydraulic unit for it, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A heavy-duty non-vehicular transporting system, comprising motor-driven drive modules each having a motor and at least one drive roller connected therewith, said motors being formed as hydraulic motors; a central hydraulic unit connected with said hydraulic motors through hydraulic hoses; two hydraulic circuits which are supplied by said central hydraulic unit, said central hydraulic unit controlling a throughflow for each of said hydraulic circuits, each of said hydraulic motors being connected with one of said hydraulic circuits by a hydraulic hose.

2. A heavy-duty non-vehicular transporting system as defined in claim 1, wherein said central hydraulic unit has at least one hydraulic pump which compresses hydraulic medium for throughflow through a corresponding one of said hydraulic circuits, and a valve arrangement for controlling which controls the throughflow of the hydraulic medium correspondingly for each of the hydraulic circuits in correspondence with control signals which are transmitted by a remote control element connected with said control.

3. A heavy-duty non-vehicular transporting system as defined in claim 2, wherein said control is connected with a wire-connected remote control element and/or with a wireless remote control element, said control ignoring control signals coming from said wireless remote control element when the wire-connected remote control element is connected to said control.

4. A heavy-duty non-vehicular transporting system as defined in claim 2, wherein said valve arrangement connected with said control changes a pressure and/or a flow direction in each of said hydraulic circuits based on corresponding control signals.

5. A heavy-duty non-vehicular transporting system as defined in claim 3, wherein said valve arrangement connected with said control changes a pressure and/or a flow direction in each of said hydraulic circuits based on corresponding control signals.

6. A heavy-duty non-vehicular transporting system as defined in claim 1, wherein in addition to said drive modules which are driven by said hydraulic motors, also driveless drive modules are provided, at least said driven drive modules are assembled by a rod-shaped connection with one another to for a drive frame.

7. A heavy-duty non-vehicular transporting system as defined in claim 6, wherein said drive frame has a rotary plate on which an object to be transported is supported, and the drive frame is freely rotatable movable about a vertical axis.

8. A drive module for a heavy-duty non-vehicular transporting system, comprising a motor, at least one drive roller connected with said motor, said motor being a hydraulic motor which is connected with a central hydraulic unit through a hydraulic hose.

9. A drive module as defined in claim 8, wherein said at least one of drive roller is a roller-shaped roller composed of duroplastic material.

10. A heavy-duty non-vehicular transporting system as defined in claim 1: and further comprising a metal plate provided with a predetermined bores pattern for mounting of the object to be transported on an outer side of said drive module.

11. A heavy-duty non-vehicular transporting system with motor-driven drive modules each having a motor and a driven roller connected with the later, said motors being hydraulic motors; a central hydraulic unit connected through hydraulic hoses with said hydraulic motors; at least two hydraulic circuits through which said hydraulic motors are supplied, each of said hydraulic motors being connected with a respective one of said hydraulic circuits, said central hydraulic unit controlling a throughflow for each of said hydraulic circuits.

12. A heavy-duty non-vehicular transporting system, comprising a plurality of motor-driven drive modules each having a motor formed as hydraulic motors; a central hydraulic unit connected with said hydraulic motors through hydraulic hoses; at least two separate circuits arranged so that a plurality of drive modules is connectable to and controllable by said central hydraulic unit via said at least two separate circuits, said modules having a load-bearing rollers and being easily put below a load to be moved and latter detachable and being easily puttable below a load to be moved and later quickly detachable therefrom.

* * * * *